(12) United States Patent
Zhao et al.

(10) Patent No.: US 10,221,517 B2
(45) Date of Patent: Mar. 5, 2019

(54) FOOT OF A WASHING MACHINE WITH AUTOMATIC LEVELING FUNCTION AND A WASHING MACHINE THEREOF

(71) Applicants: QINGDAO HAIER WASHING MACHINE CO., LTD., Qingdao, Shandong (CN); QINGDAO HAIER SMART TECHNOLOGY R&D CO., LTD., Qingdao, Shandong (CN)

(72) Inventors: Zhiqiang Zhao, Shandong (CN); Sheng Xu, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/563,288

(22) PCT Filed: Jun. 7, 2016

(86) PCT No.: PCT/CN2016/085073
§ 371 (c)(1),
(2) Date: Sep. 29, 2017

(87) PCT Pub. No.: WO2017/177529
PCT Pub. Date: Oct. 19, 2017

(65) Prior Publication Data
US 2018/0195227 A1 Jul. 12, 2018

(30) Foreign Application Priority Data
Apr. 13, 2016 (CN) .......................... 2016 1 0230114

(51) Int. Cl.
*F16M 11/24* (2006.01)
*D06F 39/12* (2006.01)
(Continued)

(52) U.S. Cl.
CPC .......... *D06F 39/125* (2013.01); *D06F 39/001* (2013.01); *D06F 39/12* (2013.01);
(Continued)

(58) Field of Classification Search
USPC ..................................................... 248/188.3
See application file for complete search history.

(56) References Cited

U.S. PATENT DOCUMENTS 2,635,838 A * 4/1953 Branson ................ F16F 15/023
188/298
2,683,576 A * 7/1954 Miller .................... D06F 39/125
248/188.3

(Continued)

*Primary Examiner* — Monica E Millner
(74) *Attorney, Agent, or Firm* — Buchanan Ingersoll & Rooney PC

(57) ABSTRACT

A foot of a washing machine comprises a foot base, a flexible accommodating body and an adjustable foot, a hollow chamber is arranged in the foot base, and the hollow chamber comprises at least a gas chamber for filling gas. The flexible accommodating body is arranged in the hollow chamber and is communicated with the gas chamber, an accommodating chamber is arranged in the flexible accommodating body and is provided with a hydraulic medium. The hydraulic medium can flow to the gas chamber under pressure. An end of the adjustable foot is relatively slidably set in the hollow chamber and the flexible accommodating body is in contact or connected with the adjustable foot. The foot of a washing machine can automatically adjust adaptively due to the fluidity of the hydraulic medium under different pressures.

10 Claims, 7 Drawing Sheets

(51) Int. Cl.
*D06F 39/00* (2006.01)
*F16F 9/06* (2006.01)

(52) U.S. Cl.
CPC .......... *F16F 9/065* (2013.01); *F16F 2222/12* (2013.01); *F16F 2236/045* (2013.01)

(56) References Cited

U.S. PATENT DOCUMENTS

| | | | | | |
|---|---|---|---|---|---|
| 3,191,895 | A * | 6/1965 | Whelan | ................... | F16F 9/19 248/188.3 |
| 4,593,951 | A * | 6/1986 | Slaats | ................... | A47C 3/30 108/147 |
| 4,625,424 | A * | 12/1986 | de la Haye | ............. | G12B 5/00 248/649 |
| 4,784,362 | A * | 11/1988 | Wang | ................... | A47C 3/30 188/298 |
| 4,801,114 | A * | 1/1989 | Price | ................... | D06F 39/125 248/188.3 |
| 4,949,923 | A * | 8/1990 | Daily | ................... | D06F 39/125 248/188.3 |
| 4,967,994 | A * | 11/1990 | Rice | ................... | D06F 39/001 248/649 |
| 5,344,116 | A * | 9/1994 | Winkler | ................ | D06F 39/125 248/188.3 |
| 5,697,586 | A * | 12/1997 | Lybarger | .............. | D06F 39/125 248/188.2 |
| 6,009,815 | A * | 1/2000 | Hartman | ................ | A47B 91/02 108/147 |
| 7,314,206 | B2 * | 1/2008 | Lee | ......................... | D06F 37/20 248/188.3 |
| 7,597,294 | B2 * | 10/2009 | Lotz | ...................... | F16M 7/00 182/200 |
| 7,673,845 | B2 * | 3/2010 | Dam | .................... | A47B 91/024 248/188.8 |
| 7,717,380 | B2 * | 5/2010 | Kwon | .................. | D06F 39/125 16/44 |
| 7,744,049 | B2 * | 6/2010 | Kwon | .................. | A47B 91/16 248/188.3 |
| 7,744,050 | B2 * | 6/2010 | de Toledo | .......... | A47L 15/4253 248/188.3 |
| 7,900,485 | B2 * | 3/2011 | Lee | ...................... | D06F 39/125 248/188.8 |
| 8,104,724 | B2 * | 1/2012 | Sorohan | ................ | A47B 91/16 248/188.3 |
| 8,118,379 | B2 * | 2/2012 | Hong | .................. | D06F 39/125 248/188.3 |
| 2006/0021391 | A1 * | 2/2006 | Yim, II | ................. | D06F 39/125 68/3 R |
| 2006/0180720 | A1 * | 8/2006 | Coumoyer | ............. | A47B 91/02 248/188.2 |
| 2008/0190696 | A1 * | 8/2008 | Pike | ...................... | A47B 91/10 182/202 |
| 2013/0313385 | A1 * | 11/2013 | Mora | .................... | F16M 7/00 248/188.4 |

\* cited by examiner

US 10,221,517 B2

FOOT OF A WASHING MACHINE WITH AUTOMATIC LEVELING FUNCTION AND A WASHING MACHINE THEREOF

FIELD OF THE INVENTION

The present disclosure relates to a field of laundry equipment, and specifically relates to a foot of a washing machine with automatic leveling function and a washing machine thereof

BACKGROUND OF THE INVENTION

A household appliance is generally provided with a leveling device at the bottom of its casing. During placement of the household appliance, the leveling device is adjusted to make the household appliance stably place. After the household appliance is leveled, the leveling device can support the household appliance to keep the household appliance stable.

Taking a washing machine for example, as shown in FIG. 1, the existing washing machine is usually provided with feet mounted at a base plate 901 of its casing or at the bottom of the whole machine. Each foot comprises a screw rod A, a nut washer B and a rubber pad C. The nut washer B rotates up and down around the screw rod A, and the screw rod A rotates up and down in a screw hole in a base plate 901 of the casing. Therefore, the height of the washing machine can be adjusted by the height of the screw rod A of the feet screwed into the screw holes of the base plate 901. Mostly, the height of the washing machine is increased if the feet of the washing machine rotate counterclockwise, and the height of the washing machine is reduced if the feet of the washing machine rotate clockwise. After the height adjustment of the feet is completed, the nut washer B for preventing loosening are tightened to keep the washing machine stable.

Although said feet of the washing machine implement the leveling of the washing machine, a user still needs to carry out manual adjustment. If the washing machine has a relatively large self-weight or a placement space for the washing machine is narrow, it is very inconvenient for users to operate. Additionally, the vibration of the washing machine in a long-term working process also influences the leveling feet, and it is easy to lead to the failure of support and to result in the washing machine being placed uneven.

For example, an existing 80 KG drum washing machine generally has a weight of about 80 KG, which is relatively heavy, so it is inconvenient to adjust the height for users. Even though the height adjustment is completed, it cannot be ensured that the washing machine is adjusted to an optimal state. When the washing machine works, especially accelerates from 0 r/min to about 1400 r/min for drying, a large vibration will occur if the washing machine is placed unlevel or has a failure of support problem, which greatly influences use comfortableness of the consumers.

In addition, the vibration of the unlevel washing machine may cause foot screw to loosen, which results in vertical movement of a foot bracket, and such instability may change the leveling state of the washing machine and cause stronger vibration. After the washing machine is used for a long term, such vicious circle makes the noise become larger and larger and it also causes some damage to the washing machine to a certain extent and shorten the service life of the washing machine.

Therefore, the leveling of the existing washing machine has problems of manual adjustment, time and labor are wasted, and precision is lower.

In the view of foregoing, the present disclosure is proposed.

SUMMARY OF THE INVENTION

To solve problems mentioned above, the first project of the present disclosure is to provide a foot of a washing machine with automatic leveling function. In particular, technical solutions are adopted as follows:

A foot of a washing machine with automatic leveling function comprises a foot base, a flexible accommodating body and an adjustable foot. a hollow chamber is arranged in the foot base and the hollow chamber at least comprises a gas chamber for being filled with gas. The flexible accommodating body is arranged in the hollow chamber and is communicated with the gas chamber.

An accommodating chamber is arranged in the flexible accommodating body and is provided with a hydraulic medium. The hydraulic medium flows to the gas chamber under pressure.

An end of the adjustable foot is relatively slidably set in the hollow chamber and the flexible accommodating body is contact or connected with the adjustable foot.

Further, a valve board is provided inside the hollow chamber of the foot base. The hollow chamber is divided to an upper chamber and a lower chamber by the valve board, and the upper chamber is the gas chamber for being filled with gas.

An end of the flexible accommodating body is open and comprises the accommodating chamber inside, the accommodating chamber is provided with hydraulic medium. The flexible accommodating body is arranged in the lower chamber and the opening of the flexible accommodating body is hermetically connected with the valve board. The valve board is provided with a conducting hole through which the hydraulic medium flows to the gas chamber under pressure.

An end of the adjustable foot is relatively slidably set in the lower chamber of the hollow chamber.

Further, the foot base comprises a cylinder block and a jacket which are connected with each other. The valve board is provided between the cylinder block and the jacket. The cylinder block is above the valve board, a chamber in the cylinder block is the gas chamber. The jacket is below the valve board.

The flexible accommodating body is arranged in the jacket. An end of the adjustable foot is relatively slidably set inside the jacket .

Further, the cylinder block, the valve board and the jacket are fastened together by bolts. An annular recess is arranged at the inner side of the upper opening of the jacket, and the opening of the flexible accommodating body is flanged outward to fowl a sealing edge structure.

The sealing edge structure is installed inside the annular recess. After the cylinder block, the valve board and the jacket are fastened together, the sealing edge structure is pressed in the annular recess to achieve a sealing connection.

Further, an end of the jacket is provided with an inner ring boss and an end of the adjustable foot is provided with an outer ring boss. The inner ring boss and the outer ring boss are engaged with each other, to prevent the adjustable foot departing from the jacket.

Further, the flexible accommodating body is a bellows structure made of a flexible material. The upper end of the bellows structure is open and the lower end is closed, and the end closed is contact or connected with the adjustable foot.

Further, the valve board is provided with an orifice and/or a valve opening.

Further, the cylinder block is provided with a screw column for connecting with the bottom of the washing machine.

Further, the interior of the adjustment foot has the hollow chamber, the adjustment foot surrounds the flexible accommodating body after installed on the jacket. Under the pressure which acts on the flexible accommodating body, the hydraulic medium flows to the gas chamber, and the flexible accommodating body drives the adjustable foot to expand and contract, to achieve automatic leveling.

A second object of the present disclosure is to provide a washing machine. In particular, technical solutions are adopted as follows.

A washing machine having the above-mentioned feet of a washing machine with an automatic leveling function comprises a casing, a plurality of the washing machine feet mounted at the bottom of the casing. The hydraulic medium being provided in the inside of the feet of a washing machine flows inside the feet or between the feet to achieve leveling.

The foot of a washing machine foot with an automatic leveling function of the present disclosure, according to the hydraulic principle, is provided with a hydraulic medium therein. The foot of a washing machine can automatically adjust adaptively due to the fluidity of the hydraulic medium under different pressures.

In addition, the foot of a washing machine foot with automatic leveling function of the present disclosure holds the hydraulic medium in the enclosed flexible accommodating body, and the flexible accommodating body is set inside the the adjustable foot. It effectively solves the problem of the leakage of the hydraulic medium and ensures the working stability of the foot of a washing machine.

Therefore, the foot of a washing machine of the present disclosure has simple structure, and lower cost. It is easy to use and has high reliability, and it can remarkably reduce the vibration, reduce noise, and can improve the comfort of the experience of the washing machine for users.

BRIEF DESCRIPTION OF THE DARWINGS

DESCRIPTION OF LABELS IN THE DRAWINGS

Figure 1:
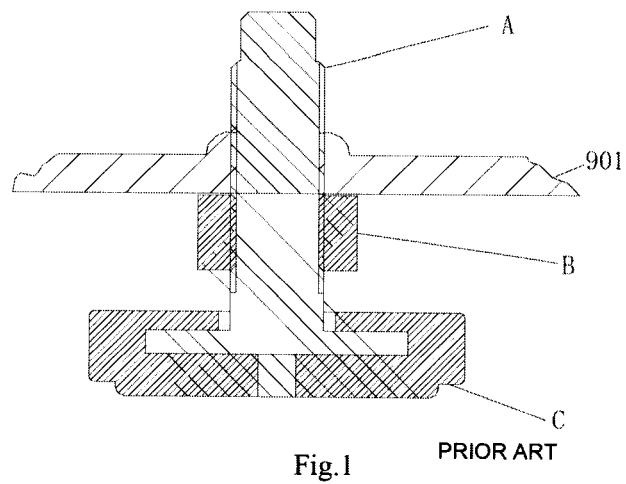
FIG. 1 is a schematic diagram of a structure of prior household appliance foot.

1—foot base 2—plunger structure 201—plug body 202—supporting body 3—oil chamber 4—gas chamber 5—orifice 6—valve opening 7—high-pressure oil pipe 701—first high-pressure oil pipe group 702—second high-pressure oil pipe group 703—third high-pressure oil pipe group 704—fourth high-pressure oil pipe group 8—hollow chamber 9—casing 901—base plate 10—foot 1001—first foot group 1002—second foot group 1003—third foot group 1004—fourth foot group 11—door window 12—detergent box 13—control panel 14—washing drum 15—communicating device 16—cylinder block 17—valve board 18—jacket 1801—inner ring boss 1802—annular recess 19—adjustable foot 1901—outer ring boss 20—screw column 21—flexible accommodating body 2101—sealing edge structure 22—seal ring 23—locking mechanism 24—screw hole 25—valve block 26—ground 2601—ground pit.

DETAILED DESCRIPTION OF THE INVENTION

The foot of a washing machine with automatic leveling function and a washing machine thereof in the present invention is described in details as follows in combination with the accompanying drawings.

A foot of a washing machine with automatic leveling function in this embodiment comprises a fixed part and a movable part, and a hollow chamber is formed between the fixed part and the movable part. The hollow chamber is provided with a hydraulic medium. Under pressures, the hydraulic medium can flow in the hollow chamber inside the foot of a washing machine and/or the hollow chamber between the washing machine feet to drive the movable parts to extend and contract, thereby implementing automatic leveling.

Under a certain pressure, the hydraulic medium in the foot of a washing machine in the embodiment compresses gas, the movable part is driven to extend and contract adaptively. When the pressure increases further, the gas is no longer compressed, the internal pressure of the gas reacts back on the hydraulic medium and the movable part has enough support force therewith. Therefore, the foot of a washing machine of the embodiment has adaptive automatic leveling function. The hydraulic medium of the embodiment can be selected from specifically hydraulic oil.

The foot of a washing machine with automatic leveling function in the embodiment, according to the hydraulic principle, is provided with the hydraulic medium therein. The foot of a washing machine can automatically adjust adaptively due to the fluidity of the hydraulic medium under different pressures.

Therefore, the foot of a washing machine of the present embodiment has simple structure, and lower cost. It is easy to use and has high reliability and it can remarkably reduce the vibration, reduce noise and improve the comfort of the experience of the washing machine for users.

As shown in FIG. 6, FIG. 7, FIG. 8 and FIG. 9, a drum washing machine is taken as an example in the present disclosure. The drum washing machine comprises:

a washing drum 14 which holds and washes clothes, a detergent box 12 which stores powder detergent, liquid detergent or softener and so on, a control panel 13 which operates the washing machine;

A door window 11 which is opened to take out or put in clothes, a motor assembly connecting at least one rotatable drive shaft to achieve at least one output, a casing 9 which keeps an entire frame and an appearance of the washing machine, and a base plate 901, under which is provided with the foot of a washing machine of the present disclosure.

Embodiment 1

Figure 6:
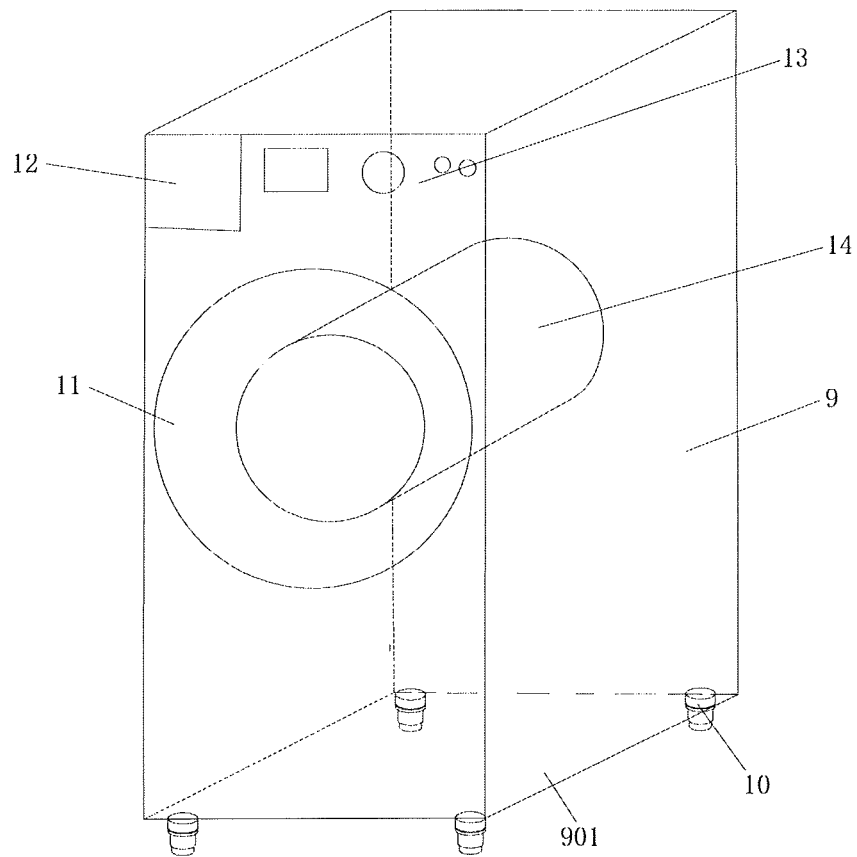
FIG. 6 is a schematic diagram of an installation of a foot of a washing machine according to an embodiment of the present disclosure.

As shown in FIG. 6, at least four feet 10 are uniformly arranged at four corners of a base plate 901 of the casing 9 or along a circumference direction of the base plate 901 of the casing 9. Each foot is filled with hydraulic medium and gas. Under different pressures, the hydraulic medium and the gas in each foot 10 interact with each other to realize the expansion and the contraction of the movable part, to level automatically.

The feet 10 of the embodiment are provided independently. The hydraulic medium and part of the gas in each foot 10 under different pressures can flow mutually inside the hollow chamber 8 of each foot 10, to achieve different amounts of compression. And then the amount of compression of the foot 10 is large when pressure is high, and the amount of compression of the foot 10 is small when pressure is low, to automatically realize the leveling of the washing machine.

At the same time, the foot of a washing machine of the present embodiment can also self-level on the partial load during a washing process and a dewatering process of the washing machine, thus realizes lower vibration and less noise.

Figure 2:
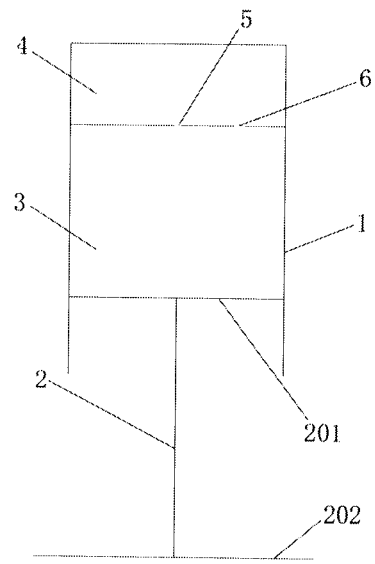
FIG. 2 is a schematic diagram of a structure of a foot of a washing machine according to an embodiment of the present disclosure.

A structure of the foot of the present embodiment is shown in FIG. 2. It comprises a foot base 1 and a plunger structure 2, and a gas chamber 4 and an oil chamber 3 are isolated in the foot base 1. The oil chamber 3 is provided with the hydraulic medium. The gas chamber 4 and the oil chamber 3 are communicated by an orifice 5 and a valve opening 6. An end of the plunger structure 2 is provided with a plug body 201 which is set relatively slidably in the oil chamber 3 and keeps the oil chamber 3 sealed, and the other end of the plunger structure 2 is provided with a supporting body 202.

When the plunger structure 2 is subject to pressure, the hydraulic medium can flow from the oil chamber 3 to the gas chamber 4 through the orifice 5 and the valve opening 6. The greater the pressure is, the length of the plunger structure 2 compressed into base 1 is longer, And then realize the height automatic regulation.

Figure 4:
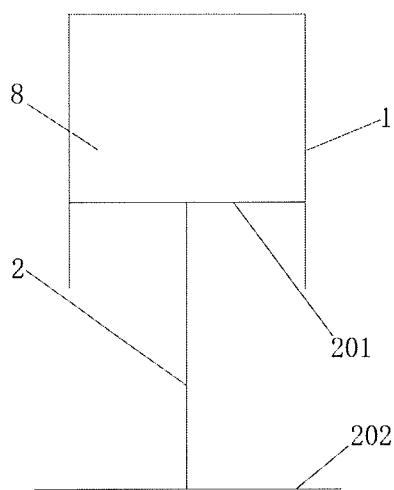
FIG. 4 is a schematic diagram of a structure of a foot of a washing machine according to another embodiment of the present disclosure.
Figure 5:
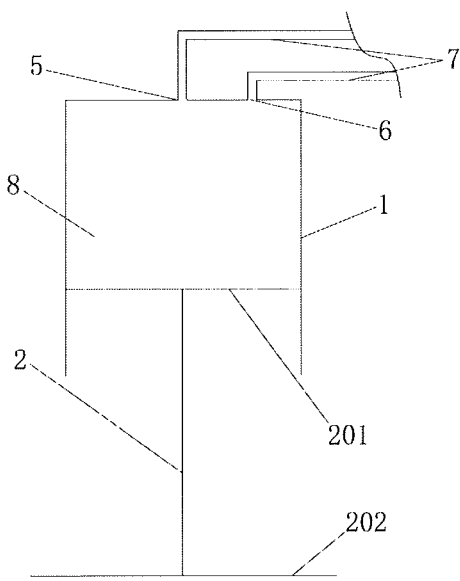
FIG. 5 is a schematic diagram of a structure of a foot of a washing machine according to another embodiment of the present disclosure.

Another structure of the foot of the present embodiment is shown in FIG. 4. The foot comprises a foot base 1 and a plunger structure 2. The foot base 1 is provided with a hollow chamber 8 therein. An end of the plunger structure 2 is provided with a plug body 201 which is set relatively slidably in the hollow chamber 8 and keeps the hollow chamber 8 sealed to form an enclosed chamber, and the enclosed chamber is provided with the hydraulic medium. The volume of the hydraulic medium is less than the maximum volume of the enclosed chamber.

The foot of the present embodiment is provided with only one hollow chamber 8. Therefore, in order to realize the flow of the hydraulic medium when the the plunger structure 2 is under pressure, a part of gas is needed in the hollow chamber 8. Therefore, the volume of the hydraulic medium is less than the maximum volume of the enclosed chamber.

When the plunger structure 2 of the present embodiment is under pressure, the hydraulic medium compresses the gas in the enclosed chamber. And the greater the pressure is, the length of the plunger structure 2 compressed into base 1 is longer, and then realize the automatic regulation of height.

Embodiment 2

Figure 7:
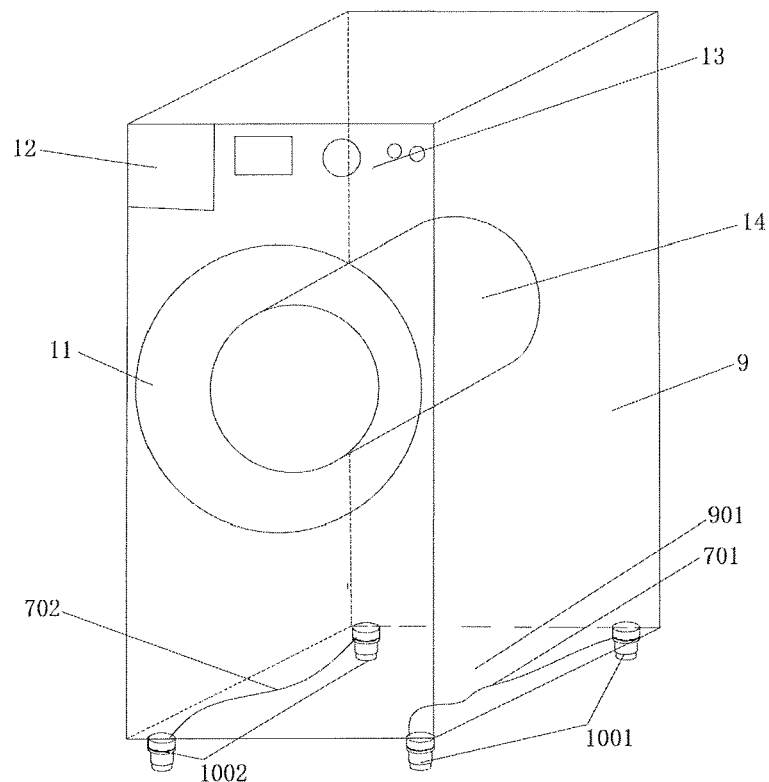
FIG. 7 is a schematic diagram of an installation of a foot of a washing machine according to another embodiment of the present disclosure.
Figure 8:
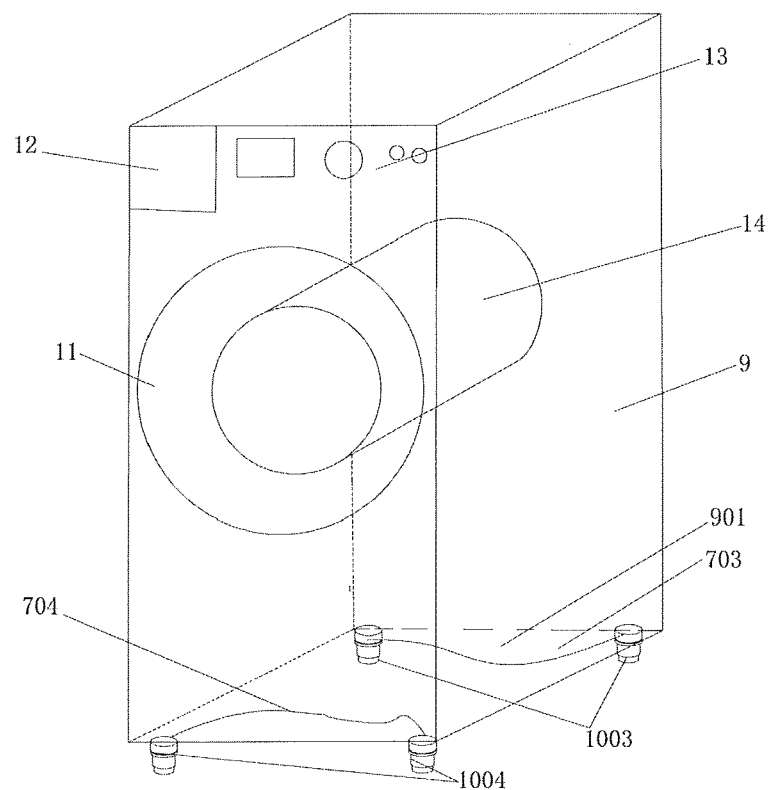
FIG. 8 is a schematic diagram of an installation of a foot of a washing machine according to another embodiment of the present disclosure.
Figure 9:
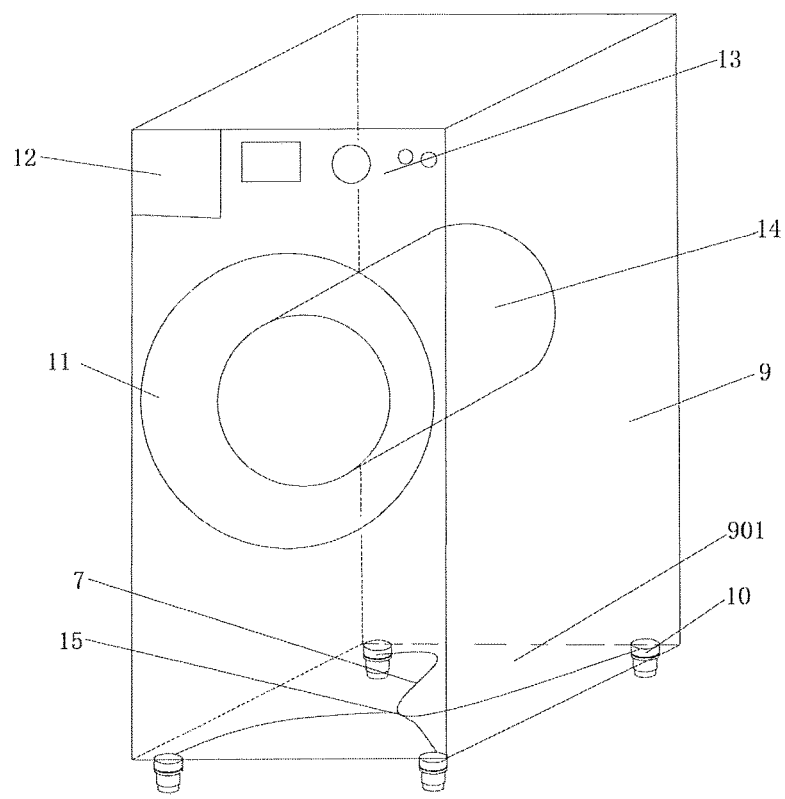
FIG. 9 is a schematic diagram of an installation of a foot of a washing machine according to another embodiment of the present disclosure.

As shown in FIG. 7, FIG. 8 and FIG. 9, at least four feet 10 are uniformly arranged at four corners of a base plate 901 of the casing 9 or along a circumference direction of the base plate 901 of the casing 9. At least two of the feet 10 are communicated with each other. Each foot 10 is filled with hydraulic medium and gas. Under the first range of pressure, the hydraulic medium and the gas in each foot 10 interact with each other to realize the expansion and the contraction of the movable part, to achieve leveling automatically. Under the second range of pressure, the hydraulic medium and the gas in the communicated feet 10 interact with each other to realize the expansion and the contraction of the movable part, to achieve leveling automatically.

The feet 10 of the present embodiment are communicated with each other so that the hydraulic medium inside the foot 10 can not only flow inside itself but also be able to keep communicated between the feet 10. When one foot 10 is subjected to compressing, the hydraulic medium flows to the other foot communicated with it. The amount of the hydraulic medium in the other foot increases, and the increased pressure make the foot extend out so as to ensure sufficient support force.

Figure 3:
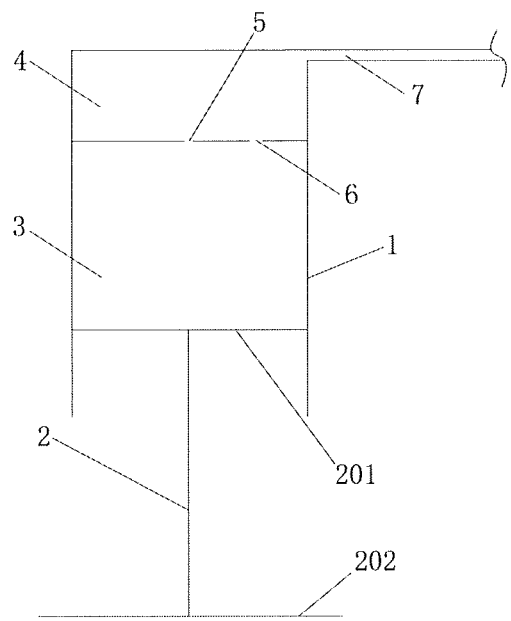
FIG. 3 is a schematic diagram of a structure of a foot of a washing machine according to another embodiment of the present disclosure.

A structure of a foot of the present embodiment is shown in FIG. 3. It comprises a foot base 1 and a plunger structure 2, and at least one high-pressure oil pipe. A gas chamber 4 and an oil chamber 3 are isolated in the foot base 1. The oil chamber 3 is provided with the hydraulic medium. The gas chamber 4 and the oil chamber 3 are communicated by an orifice 5 and a valve opening 6. An end of the plunger structure 2 has a plug body 201, which is set relatively slidably in the oil chamber 3 and keeps the oil chamber 3 sealed, and the other end of the plunger structure 2 has a supporting body 202. The high-pressure oil pipe 7 are respectively communicated with the gas chambers 4 of two feet.

A structure of a foot of the present embodiment is shown in FIG. 3. It comprises a foot base 1 and a plunger structure 2, and at least one high-pressure oil pipe 7. The foot base 1 is provided with a hollow chamber 8 therein. An end of the plunger structure 2 is provided with a plug body 201 which is set relatively slidably in the hollow chamber 8 and keeps the hollow chamber 8 sealed to form an enclosed chamber, and the enclosed chamber is provided with hydraulic medium. The volume of the hydraulic medium is less than the maximum volume of the enclosed chamber. An orifice 5 and a valve opening 6 are arranged respectively on the top of the enclosed chamber, and the high-pressure oil pipe 7 is respectively communicated with the orifices 5 and the valve openings 6 of two feet.

Four feet are provided in the present embodiment, and are divided into two sets of feet which is communicated with each other. The two feet that are adjacent or two feet diagonally set are communicated with each other.

Specifically, as shown in FIG. 7, four feet are fixed on the four corners of the base plate 901 of the washing machine. A plurality of high-pressure oil pipes 7 form a first high-pressure oil pipe group 701, and the first high-pressure oil pipe group 701 is communicated with two feet on the left side of the base plate 901 of the washing machine, and the two feet form a first foot group 1001. A plurality of high-pressure oil pipes 7 form a second high-pressure oil pipe group 702, and the second high-pressure oil pipe group 701 is communicated with two feet on the right side of the base plate 901 of the washing machine, the two feet forms a second foot group 1002.

In this way, the hydraulic medium and part of the gas of the first foot group 1001 can flow between the two feet under different pressures. And the hydraulic medium and part of the gas of the second foot group 1002 can flow mutually between the two feet under different pressures.

As shown in FIG. 8, four feet are fixed on the four corners of the base plate 901 of the washing machine. A plurality of high-pressure oil pipes 7 foil a third high-pressure oil pipe group 703, and the third high-pressure oil pipe group 703 is communicated with two feet on the back side of the base plate 901 of the washing machine, two feet forms a third foot group 1003. A plurality of high-pressure oil pipes 7 form a fourth high-pressure oil pipe group 704, and the fourth high-pressure oil pipe group 704 is communicated with two feet in the front side of the base plate 901 of the washing machine, and two feet form a fourth foot group 1004.

In this way, the hydraulic medium and part of the gas of the third foot group 1003 can flow mutually between the two feet under different pressures. And the hydraulic medium and part of the gas of the fourth foot group 1004 flows mutually between the two feet under different pressures.

As shown in FIG. 9, at least four feet 10 are provided evenly in four corners of the base plate 901 of the casing 9 or uniformly arranged in a circumference direction of the base plate 901 of the casing 9. Each foot 10 is filled with hydraulic medium and gas. In the first range of pressure, the hydraulic medium and the gas inside the each foot 10 interact with each other to realize the expansion and the contraction of the movable part, to achieve leveling automatically. In the second range of pressure, the hydraulic medium and the gas inside the communicated feet 10 interact with each other to realize the expansion and the contraction of the movable part, to achieve leveling automatically. In this way, the connection between all the feet is realized, and the liquid medium can be circulated between all the feet. The adjustment range is larger, and the adjustment effect is better.

Specifically, the foot 10 is provided inside with an enclosed chamber which is filled with hydraulic medium and gas. The enclosed chamber is communicated with at least one high-pressure oil pipe 7, and the high-pressure oil pipe 7 of each foot 7 is respectively communicated to a communicating device 15 to achieve the mutual communication between all the feet 10.

Therefore, the foot of a washing machine of the present embodiment enables that the amount of compression of the foot under large pressure is large and the foot under small pressure can extend under the action of oil pressure, and then realizes automatically leveling the washing machine. At the same time, the foot of a washing machine of the present embodiment can also self-level on the partial load during the washing process and the dewatering process of the washing machine, thereby achieving lower vibration and less noise.

Embodiment 3

Figure 10:
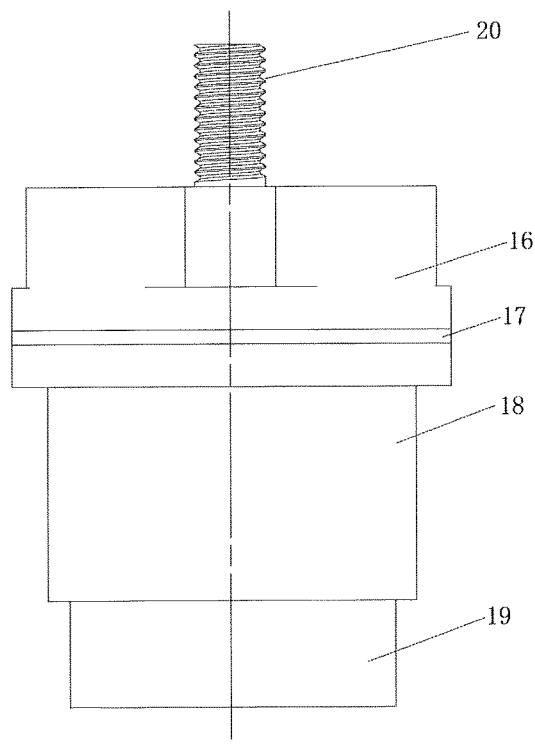
FIG. 10 is a schematic diagram of a foot of a washing machine according to another embodiment of the present disclosure.
Figure 11:
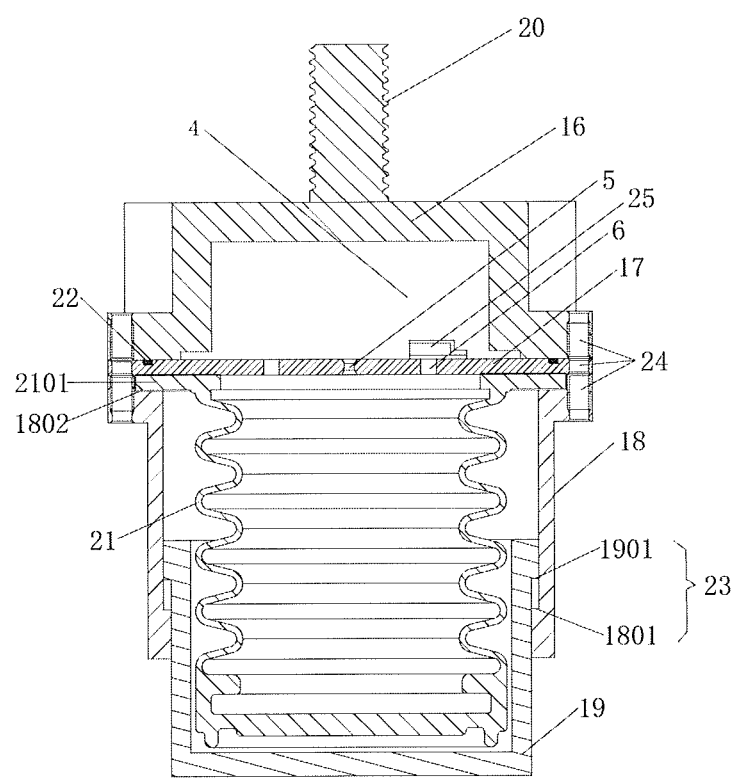
FIG. 11 is a sectional view of the foot of a washing machine shown in FIG. 10 of the present disclosure.
Figure 12:
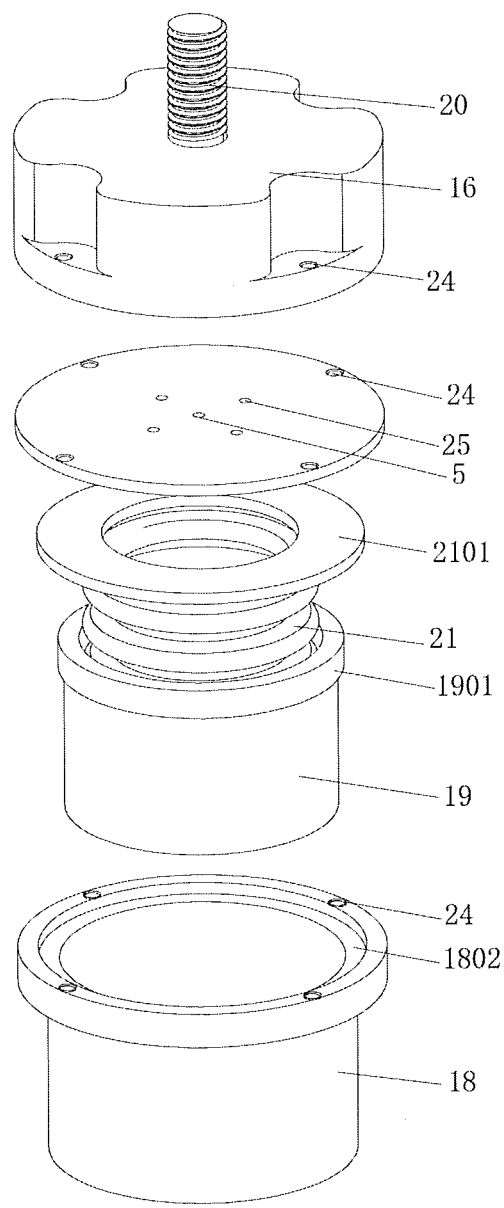
FIG. 12 is an explosive diagram of the foot of a washing machine shown in FIG. 10 of the present disclosure.

As shown in FIG. 10, FIG. 11 and FIG. 12, the foot of a washing machine with automatic leveling function of this embodiment comprises a foot base, a flexible accommodating body 21 and an adjustable foot 19. The foot base is provided with a hollow chamber and the hollow chamber at least comprises a gas chamber 4 for filling gas. The flexible accommodating body 21 is arranged in the hollow chamber and is communicated with the gas chamber 4.

The flexible accommodating body 21 has an accommodating chamber therein and the accommodating chamber is provided with a hydraulic medium. The hydraulic medium flows to the gas chamber 4 under pressure.

An end of the adjustable foot 19 is relatively slidably set in the hollow chamber and the flexible accommodating body 21 is contact or connected with the adjustable foot 19.

The foot of a washing machine with automatic leveling function of the embodiment, according to the hydraulic principle, is filled with a hydraulic medium therein. Under different pressures, the feet can automatically adjust adaptively due to the fluidity of the hydraulic medium.

In addition, the foot of a washing machine with automatic leveling function of the embodiment holds the hydraulic medium in the enclosed flexible accommodating body 21, and the flexible accommodating body 21 is set inside the the adjustable foot 19. It effectively solves the problem of the leakage of the hydraulic medium and ensures the working stability of the foot.

Therefore, the foot of a washing machine of the present embodiment has simple structure, and lower cost. It is easy to use and has high reliability, and it can remarkably reduce the vibration, reduce noise, and improve the comfort of the experience of the washing machine for users.

Specifically, a valve board 17 is provided inside the hollow chamber of the foot base. The hollow chamber is divided to an upper chamber and a lower chamber by the valve board 17, and the upper chamber is a gas chamber 4 which is used to be filled with gas. An end of the flexible accommodating body 21 is open and an accommodating chamber is provided therein. The accommodating chamber is filled with hydraulic medium. The flexible accommodating body 21 is arranged in the lower chamber and the opening of the flexible accommodating body 21 is hermetically connected to the valve board 17. The valve board 17 is provided with a conducting hole through which the hydraulic medium flows to the gas chamber under pressure. An end of the adjustable foot 19 is relatively slidably set in the lower chamber of the hollow chamber.

The hollow chamber of the foot base of the embodiment is divided to chambers which are communicated with each other. One chamber is used as the gas chamber 4 and the other chamber is provided with the flexible accommodating body 21. At the same time, the adjustable foot 19 is relatively slidably set in the lower chamber of the hollow chamber. That makes the flexible accommodating body 21 be in the enclosed chamber between the adjustable foot 19 and the lower chamber of the hollow chamber. The flexible accommodating body 21 is squeezed when the adjustable foot 19 is compressed, and the hydraulic medium inside the flexible accommodating body 21 flows under compression to achieve automatic leveling.

Further, the foot base comprises a cylinder block 16 and a jacket 18 which are connected with each other. The valve board 17 is provided between the cylinder block 16 and the jacket 18. Above the valve board 17 is the cylinder block 16, a chamber in the cylinder block is the gas chamber 4. Below the valve board 17 is the jacket 18, and the flexible accommodating body 21 is arranged in the jacket 18. An end of the adjustable foot 19 is relatively slidably set inside the jacket 18.

In the present embodiment, when the valve board 17, the cylinder block 16 and the jacket 18 are assembled, it is necessary to maintain the sealing property of the assembly due to the flow of the hydraulic medium in the flexible accommodating body 21. Thus, the cylinder block 16, the valve board 17 and the jacket 18 are fastened together by bolts. The cylinder block 16, the valve board 17 and the jacket 18 are respectively provided with screw holes 24. An annular recess 1802 is arranged at the inner side of the upper opening of the jacket 18, and the opening of the flexible accommodating body 21 is flanged outward to form a sealing edge structure 2101. The sealing edge structure 2101 is installed inside the annular recess 1802. After the cylinder block 16, the valve board 17 and the jacket 18 are fastened together, the sealing edge structure 2101 is pressed in the annular recess 1802 to achieve a sealing connection.

Further, a seal ring 22 is arranged between the valve board 17 and the cylinder block 16 in the embodiment for keeping the sealed connection between them, to avoid leakage of gas and oil.

An end of the jacket 18 is provided with an inner ring boss 1801 and an end of the adjustable foot 19 is provided with an outer ring boss 1901. The inner ring boss 1801 and the outer ring boss 1901 are engaged with each other. The inner ring boss 1801 cooperates with the outer ring boss 1901 to form a locking mechanism 23, to prevent the adjustable foot 19 departing from the jacket 18.

Further, the diameter of inner ring boss 1801 is smaller than the diameter of outer ring boss 1901, which has locking function for the adjustable foot 19. It prevents the adjustable foot 19 departing from the jacket 18 accidentally, which can result in infinite expansion of the flexible accommodating body 21 to cause the jacket 18 to burst at high pressure or result in that the flexible accommodating body 21 is in direct contact with the ground to cause the burst due to sharp objects.

The flexible accommodating body 21 of the present embodiment is a bellows structure made of flexible material. The upper end of the bellows structure is open, the lower end is closed, and the closed end is contact or connected with the adjustable foot. The flexible accommodating body 21 is made of a flexible material and has better deformation, to accommodate with the telescopic extrusion of the adjustable foot 19. The bellows structure allows compression under large pressure and recovery under small pressure.

The valve board 17 of the embodiment is provided with an orifice 5 and/or a valve opening 6, and the orifice 5 makes the hydraulic medium and the gas slowly pass through. The valve opening 6 is provided with a valve block 25, which can seal the valve opening when the foot is subjected to great force suddenly or is under great pressure, to save the flow and avoid the fault of the foot caused by excessive pressure of the hydraulic medium.

The cylinder block 16 of the embodiment is provided with a screw column 20 for connecting the bottom of the washing machine. The screw column 20 can be screwed directly into screw holes of the base plate of the washing machine. Of course, it is possible to conceive that the screw column 20 can be removed and some through-holes are provided, and then the foot is fixed to the base plate 901 by bolts or screws.

The adjustable foot 19 of the embodiment is provided with a hollow chamber. The adjustment foot 19 surrounds the flexible accommodating body 21 after being installed on the jacket 18. Under the pressure which acts on the flexible accommodating body 21, the hydraulic medium flows to the gas chamber 4, and the flexible accommodating body 21 drives the adjustable foot 19 to expand and contract, to achieve the automatic leveling.

The foot of a washing machine of the embodiment uses the gas as the elastic medium and the liquid medium as the force transmission medium. It has not only a good ability of cushioning, but also a damping effect. At the same time, it can also adjust the height of the foot itself according to the size of the pressure it withstands.

When the load of the foot is large, the adjustable foot 19 moves upward to make the volume of the hollow chamber of the flexible accommodating body 21 which is full of the hydraulic medium reduce. The hydraulic medium is forced to flow into the gas chamber 4 through the orifice 5 and the valve opening 6. The volume of the gas chamber 4 is reduced, the pressure of the gas is increased, and the height of the entire foot is reduced. When the external load is equal to the pressure of the gas and the hydraulic medium, the adjustable foot 19 stops moving up. Thus, the distance that the adjustable foot 19 moves upward into the jacket 18 is related to the size of the load subjected. At this time, the relative position of the adjustable foot 19 to the base plate 901 of the washing machine is not changed any longer and the automatic adjustment of the foot of a washing machine is completed.

Figure 13:
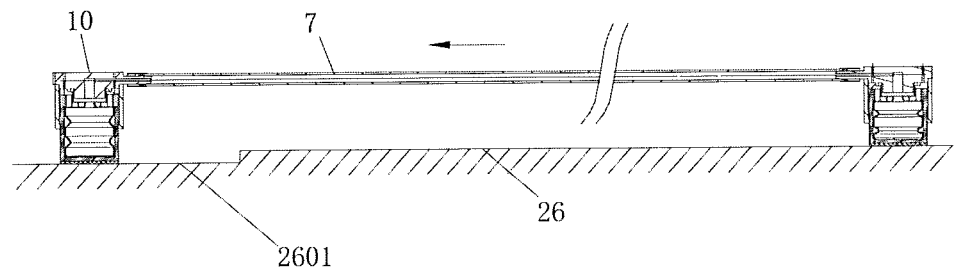
FIG. 13 is a schematic diagram of the foot of a washing machine of the present disclosure in a working state.

As shown in FIG. 13, it specifically explains the principle of leveling. When the washing machine is installed, it results in different levels of different feet height because the ground 26 is uneven, and the position of the foot located in a ground pit 2601 is low. It is possible to know that the foot in the high position bears the weight of the washing machine at first and bears greater gravity. The foot in the low position due to a failure of support may bear smaller gravity. The adjustable foot of the foot in the high position moves upward under greater pressure. The height of the entire foot gets smaller to make the volume of the hollow chamber of the flexible accommodating body 21 to be compressed and reduced, forces the hydraulic medium to flow into the orifice or the valve opening and flow into the foot which is in the lower position through the high-pressure oil pipe group. So the hydraulic medium of the flexible accommodating body of the foot in the lower positin gets more and more and the flexible accommodating body expands to drive the adjustable foot to extend.

When hydraulic pressures of the foot in the higher position and the foot in the lower position are equal, the hydraulic medium no longer flows through the high-pressure oil pipe group and the relative positions of the adjustable foot to the base plate of the washing machine no longer change, and the automatic adjustment of the feet of the washing machine is completed.

In the washing process and the dewatering process of the washing machine, because the hydraulic medium can still flow slowly to self-level, the vibration noise of the washing machine is greatly reduced.

A washing machine which has the above-mentioned foot of a washing machine with automatic leveling function is provided at the same time in the embodiment. The washing machine comprises a casing 9, a plurality of the washing machine feet mounted at the bottom of the casing, and the hydraulic medium filling inside the feet of the washing machine flows inside the feet or between the feet to achieve leveling.

The factory setting of the washing machine of the embodiment is preferably that heights of four feet of the washing machine are the same. The washing machine is randomly placed on an uneven ground, and the four feet bear different pressures according to the uneven states and the lengths that adjustable feet are pressed into jackets are different, and then the automatic leveling of the washing machine is realized.

Further illustrations for the above embodiments are as follows:

1. Every two of the feet of the embodiments in the present disclosure are communicated. It can be three or more and the number N≥2, preferably two. It costs the lowest and can achieve better results.

Four end openings of the communicating device 15 are applied to be respectively connected with four feet. It is reasonable that three, five, six or N end openings of the communicating device 15 are applied, and the end openings are respectively connected with three, five, six or N feet. The above-described embodiments apply four feet which is the most suitable merely in the situation of being capable of achieving the described functions, to control the cost to the minimum.

2. The embodiments of the present disclosure take a drum washing machine as an example to describe the principle and the method of the automatic leveling of the drum washing machine. What is easy to associate with is that the present disclosure can be applied to a pulsator washing machine.

3. The embodiments of the present disclosure take a washing machine as an example to describe the principle and the method of the automatic leveling of the washing machine. What is easy to associate with is that the present disclosure can be applied to refrigerators, freezers, dishwashers and other household appliances.

The foregoing is merely illustrative of the preferred embodiments of the present invention and is not intended to be limiting of the present invention. While the invention has been disclosed by way of example with reference to the preferred embodiments, it is not intended to be limiting of the invention. Any person skilled in the art will, without departing from the scope of the technical solution of the present invention, may make use of the technical contents of the above-mentioned tips to make some alterations or modifications to equivalent embodiments, but without departing from the scope of the technical solution of the present invention. Any and all modifications, equivalents, and modifications of the foregoing embodiments are within the scope of the present invention without departing from the spirit of the technical solution of the present invention in accordance with the technical details of the present invention.

The invention claimed is:

1. A foot of a washing machine with automatic leveling function, comprising a foot base, a flexible accommodating body and an adjustable foot, wherein,
a hollow chamber is arranged in the foot base, a valve board is provided in the hollow chamber of the foot base, the hollow chamber is divided to an upper chamber and a lower chamber by the valve board, the upper chamber is the gas chamber for being filled with gas,
the flexible accommodating body is arranged in the lower chamber, an accommodating chamber is arranged in the flexible accommodating body and is provided with a hydraulic medium,
the valve board is provided with a conducting hole through which the hydraulic medium flows to the gas chamber under pressure, and a space between the flexible accommodating body and the lower chamber is not communicated with the gas chamber,
an end of the adjustable foot is relatively slidably set in the hollow chamber, and the flexible accommodating body is contact or connected with the adjustable foot.

2. The foot of a washing machine with automatic leveling function according to claim 1, wherein:
an end of the flexible accommodating body is open and the accommodating chamber is provided with hydraulic medium; the opening of the flexible accommodating body is hermetically connected with the valve board, and
an end of the adjustable foot is relatively slidably set in the lower chamber of the hollow chamber.

3. The foot of a washing machine with automatic leveling function according to claim 2, wherein: the foot base comprises a cylinder block and a jacket which are connected with each other, the valve board is arranged between the cylinder block and the jacket, and the cylinder block is above the valve board, a chamber in the cylinder block is the gas chamber, and the jacket is under the valve board;
and the flexible accommodating body is arranged in the jacket and an end of the adjustable foot is relatively slidably set inside the jacket.

4. The foot of a washing machine with automatic leveling function according to claim 3, wherein: the cylinder block, the valve board and the jacket are fastened together by bolts, an annular recess is arranged at the inner side of the upper opening of the jacket, and the opening of the flexible accommodating body is flanged outward to form a sealing edge structure;
the sealing edge structure is installed inside the annular recess, and the sealing edge structure is pressed in the annular recess to form a sealing connection after the cylinder block, the valve board and the jacket are fastened together.

5. The foot of a washing machine with automatic leveling function according to claim 3, wherein: an end of the jacket is provided with an inner ring boss, an end of the adjustable foot is provided with an outer ring boss, and the inner ring boss and the outer ring boss are engaged with each other to prevent the adjustable foot departing from the jacket.

6. The foot of a washing machine with automatic leveling function according to claim 3, wherein: the flexible accommodating body is a bellows structure made of flexible material, an upper end of the bellows structure is open and a lower end of the bellows structure is closed, and the lower end closed is contact or connected with the adjustable foot.

7. The foot of a washing machine with automatic leveling function according to claim 3, wherein: the valve board is provided with an orifice and/or a valve opening.

8. The foot of a washing machine with automatic leveling function according to claim 3, wherein: the cylinder block is provided with a screw column for connecting with the bottom of the washing machine.

9. The foot of a washing machine with automatic leveling function according to claim 3, wherein: the interior of the adjustment foot has the hollow chamber, the adjustment foot surrounds the flexible accommodating body after installed on the jacket, and
the hydraulic medium flows to the gas chamber under the pressure which acts on the flexible accommodating body and the flexible accommodating body drives the adjustable foot to expand and contract, to level automatically.

10. A washing machine having the foot of a washing machine with automatic leveling function according claim 1, comprising a casing, and a plurality of the washing machine feet mounted at the bottom of the casing, wherein, hydraulic medium being provided in the inside of the washing machine feet flows inside the feet or between the feet of a washing machine to level.

* * * * *